(12) United States Patent
Sparks et al.

(10) Patent No.: US 7,270,359 B2
(45) Date of Patent: Sep. 18, 2007

(54) ASSIST HANDLE ASSEMBLY WITH ACCESSORIES

(75) Inventors: Brian J. Sparks, Holland, MI (US); Thomas S. Hodgson, Holland, MI (US); Mathias R. Fox, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 110 days.

(21) Appl. No.: 10/884,118

(22) Filed: Jul. 2, 2004

(65) Prior Publication Data

US 2005/0006917 A1    Jan. 13, 2005

Related U.S. Application Data

(60) Provisional application No. 60/485,236, filed on Jul. 7, 2003.

(51) Int. Cl.
*B60Q 3/02* (2006.01)
(52) U.S. Cl. .................. 296/1.02; 16/110.5
(58) Field of Classification Search ........... 296/1.02, 296/214; 224/927; 16/110.5, 125, 111 R, 16/444, 445
See application file for complete search history.

(56) References Cited

U.S. PATENT DOCUMENTS

| 3,752,376 | A | * | 8/1973 | Shelton et al. |
|---|---|---|---|---|
| 3,838,747 | A | | 10/1974 | Letzel et al. |
| 5,285,551 | A | | 2/1994 | Weiland et al. |
| 5,297,010 | A | | 3/1994 | Camarota et al. |
| 5,366,127 | A | | 11/1994 | Heinz |
| 5,625,921 | A | | 5/1997 | Smith |
| 5,910,077 | A | | 6/1999 | Aumiller et al. |
| 5,991,976 | A | | 11/1999 | Adams et al. |
| 6,076,233 | A | | 6/2000 | Sasaki et al. |
| 6,095,469 | A | | 8/2000 | Von Alman |
| 6,106,055 | A | | 8/2000 | Fischer |
| 6,234,570 | B1 | | 5/2001 | Quinno et al. |
| 6,397,435 | B1 | | 6/2002 | Gosselet |
| 6,523,888 | B1 | | 2/2003 | Yan et al. |
| 6,553,629 | B2 | * | 4/2003 | Grady et al. |

* cited by examiner

*Primary Examiner*—Stephen Gordon
(74) *Attorney, Agent, or Firm*—Foley & Lardner LLP

(57) ABSTRACT

An assist handle assembly for a vehicle includes a handle member coupled to a structural member of the vehicle, the handle member having a first end and a second end. Connecting structure is provided on at least one of the first end and the second end to receive at least one accessory. The assist handle assembly may also include a connecting member having a contact that is configured to provide a utility interface with the accessory.

22 Claims, 5 Drawing Sheets

ASSIST HANDLE ASSEMBLY WITH ACCESSORIES

CROSS REFERENCE TO RELATED APPLICATIONS

The present Application claims the benefit of priority, as available under 35 U.S.C. § 119(e)(1) to U.S. Provisional Patent Application Ser. No. 60/485,236 titled "Assist Handle Assembly With Accessories" filed on Jul. 7, 2003 (which is incorporated by reference in its entirety).

FIELD

The present invention relates to an assist handle assembly for use in vehicles. More specifically, the present invention relates to an assist handle assembly with accessories. The present invention relates more particularly to an assist handle assembly with interchangeable and consumer-selectable accessories for use in vehicles.

BACKGROUND

Assist handles for use in vehicles are generally known to include a handle structure for a user to grasp during entry to and egress from the vehicle, or to steady the user during vehicle maneuvering. It is also generally known to increase the functionality of the assist handle. For example, U.S. Pat. No. 6,523,888 shows an assist handle with an integrated map light; U.S. Pat. No. 6,076,233 shows an assist handle assembly having a hook upon which coats or other articles may be hung; U.S. Pat. No. 5,366,127 shows an assist handle assembly with a garment hanger and a lamp; U.S. Pat. No. 5,297,010 shows an assist handle for a vehicle having a recessed light socket; and U.S. Pat. No. 3,838,747 shows an assist handle having a vent nozzle.

Other known assist handles include structures for facilitating installation. For example, U.S. Pat. No. 6,106,055 discloses a mounting clip which passes through a lug of the handle. In addition, this patent discloses a cover for the fastener in the form of a cover housing connected to the fastener clip by a living hinge.

However, these known assist handles do not permit a variety of accessories to be located at one or both ends of the assist handle. These assist handles also do not generally provide for interchanging a variety of accessories on an assist handle for a vehicle, or permit a consumer to customize the selection of accessories and corresponding functions available within a vehicle.

Accordingly, it would be advantageous to provide an assist handle assembly that is adapted to provide a variety of functions. It would also be advantageous to provide an assist handle assembly for a vehicle that may be customized by a consumer. It would be further advantageous to provide an assist handle assembly configured in a modular form that may be used with or without other functional or aesthetic accessories. It would be further advantageous to provide an assist handle assembly for a vehicle that is adapted for use with a variety of accessories. It would be further advantageous to provide an assist handle assembly for a vehicle that is adapted to interchangeably receive a variety of accessories.

Accordingly, it would be advantageous to provide an assist handle assembly having any one or more of these or other advantageous features.

SUMMARY

How the above-mentioned and other advantageous features of the present invention are accomplished will be described later in this specification in conjunction with the FIGURES. Generally, however, they are accomplished individually, collectively or in various subcombinations by an assist handle assembly which, in addition to the structure used to attach it to the vehicle, further includes coupling structure at one or both ends for receiving one of a variety of accessories. The accessories may be selected either by the vehicle manufacturer, or more preferably by the vehicle owner. In an illustrated embodiment of the invention, the coupling structure is located beneath a cap which trims out the coupling location, if it is not to be used. In the illustrated embodiment, the cap is shown as a pivotable housing attached to the remainder of the assembly by a living hinge. In this embodiment, the cap may be easily removed prior to, or following, the attachment of an accessory, e.g., by severing the living hinge area with a knife, etc. The cap then may be discarded or saved for reattachment to the handle assembly if the accessory is permanently or temporarily removed.

The advantageous features are also accomplished by providing a variety of coupling styles and a variety of accessories, including functional or aesthetic, powered and/or non-powered accessories. A few examples (the list is not intending to be limiting) are hooks, lights, power ports, storage compartments, microphones, speakers, audio jacks and controls, cameras, air fresheners, vents, rod hangers, brackets, color or logo inserts, occupant sensors, anti-theft detectors, and the like.

The advantageous features are also provided by a system which readily permits any of the accessories to be interchanged or updated at the discretion of the manufacturer or consumer, i.e., they are removable, preferably without affecting the integrity of the handle attachment to the vehicle side rails, cross-bows, instrument panel, etc. This is intended to provide maximum flexibility and to enhance consumer appreciation for and desire to own a particular vehicle.

Other ways in which the above-noted and other features of the present invention are accomplished will become apparent to those skilled in the art after they have read the specification. Such other ways are deemed to fall within the scope of the present invention if they fall within the scope of the claims which follow.

BRIEF DESCRIPTION OF THE DRAWINGS

In the various FIGURES, like reference numerals are used to indicate like components.

DETAILED DESCRIPTION

Figure 1:
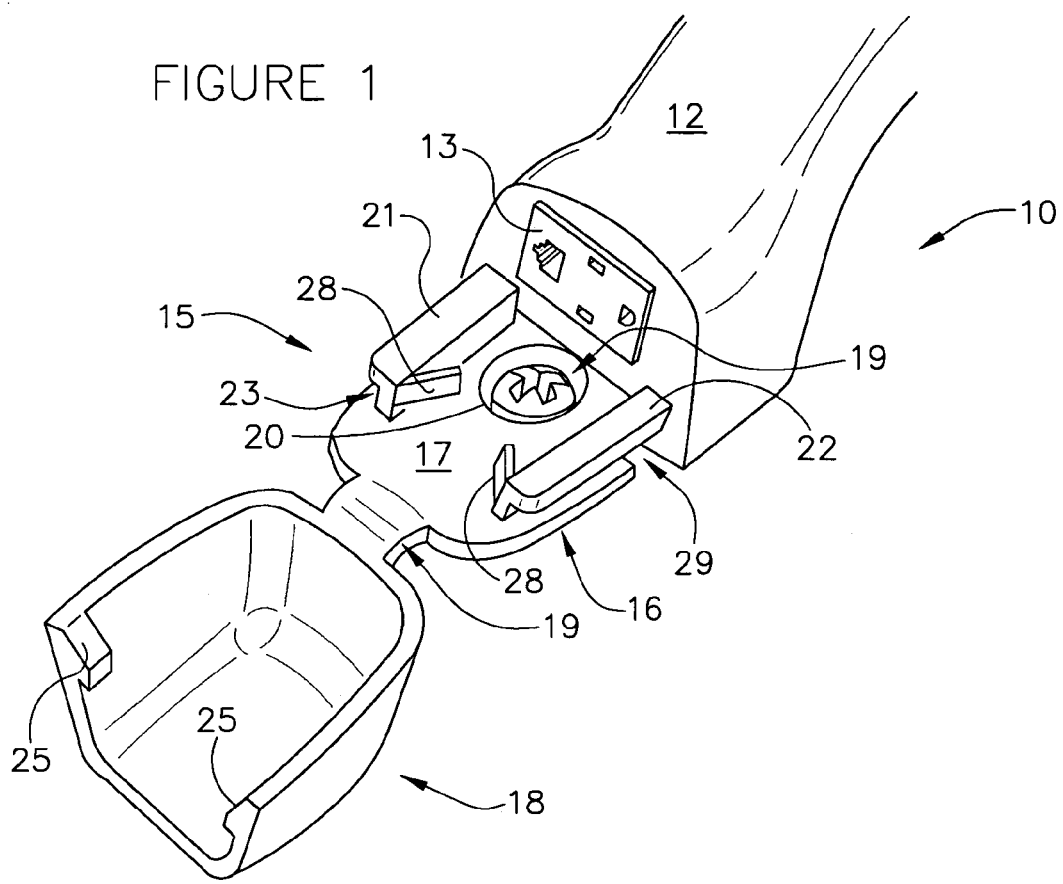
FIG. 1 is a schematic representation of a perspective view of an assist handle according to an embodiment of the invention and showing an end cap in its open position to expose one coupling arrangement.

Before beginning the detailed description of the embodiments of the present invention, several general comments can be made about the applicability and scope of the embodiments. Such general comments should not be taken as limiting of the scope of the present invention.

First, the present invention is adaptable to any of a wide variety of assist handle assembly styles, shapes, locations, sizes, materials, etc. For example, the assist handle could be located on the vehicle's overhead system, side rails, roof bows, doors, pillars, consoles, instrument panel, etc. Any number of assist handle assemblies according to the present invention could be used in a single vehicle, and any one or more of them could include accessories as described herein. For example, assist handle assemblies could be provided for outboard passengers in each seat row, or only those in second or third row seats (if present). Furthermore, the assist handle assemblies could be simple straps, pivoting handles (with or without dampening capabilities), etc.

Second, the assist handle assemblies of the present invention could include accessory attachment capabilities at one or both ends. Although only a single attachment-enabled end of a single assist handle of a vehicle is shown in the FIGURES, a plurality of assist handles each having one or more accessory attachment locations may be included, thus providing a large number of customization options.

Third, the way in which the assist handle assemblies of the present invention are attached to the vehicle does not, in and of itself, form part of the present invention. Any of the known fastener systems (screws, welds, clips, adhesives, etc.) could be used, and details of such conventional systems will not be provided in this specification.

Further, the coupling technique employed to attach an accessory to the assist handle assembly can be variously embodied. Snap fits, detents, cam locks (e.g., rotatable locking systems), clips, rails, ribs, Velcro®, slots, or more conventional fastener systems (such as screw fasteners, adhesives, etc.) may be used to permanently or removably attach the accessories to the assist handle assemblies.

Fifth, accessories may be powered or non-powered. If powered, they may be hard wired to the vehicle's electrical system or be coupled thereto at the time of attachment, such as by using contact-to-contact techniques (e.g. connectors, plugs, sockets, spring-biased contacts, etc.). Power accessories may also receive power from batteries, solar cells or the like, instead of from the vehicle electrical system. Alternatively, the accessories may receive wireless signals from other components that are either within or exterior to the vehicle.

Sixth, the cap shown in the illustrated embodiment is coupled to the assist handle assembly by a living hinge, but the cap can be a separate piece attached to the assist handle assembly by any of the above-described coupling techniques. The primary function of the cap is to cover the coupling components when not being used. The living hinge system provides convenience and an easy way to separate the cap from the assist handle assembly when an accessory is added. If the accessory is subsequently removed, the severed cap can be reattached to the assist handle assembly.

Seventh, decorative accessories, rather than those which perform utilitarian functions, can be used with the assist handle assemblies of the present invention. For example, colored caps can replace those provided with the vehicle to customize the vehicle interior. School or sports team colors are an example of such aesthetic customization. Or logo accessories, relating to sports, hobbies, schools, companies and the like could be used, either alone or in combination with utilitarian accessories.

Eighth, materials for the assist handle assemblies and accessories can vary widely and include metals, plastics, glass, and other materials known to the vehicle trim art. For example, accessories could be made of aluminum or other metals or alloys to provide a distinctive appearance as well as performance capabilities which might exceed those of plastics and other materials typically used for vehicle trim.

Finally, the assist handle assemblies of the present invention can be used in a wide variety of vehicles, including cars, SUVs, trucks, vans, boats, buses, trains, subway cars, to name several.

Proceeding now to a description of an embodiment of the present invention, FIG. 1 shows an assist handle assembly 10 including a handle component 12 and a coupling component 15. As indicated previously, the handle portion 12 may be of any type already known to the assist handle art. Handle portion 12 is shown to include an electrical and/or data signal connector 13 at one end configured to interface with the various accessories, however the connector may be provided at one or both ends.

Coupling component 15 is shown to include a plate 16 having an aperture 20 therein. A fastener 19 is shown to extend through aperture 20 for attachment of the assembly 10 to a vehicle at the desired location.

Coupling component 15 further includes a cap 18 coupled to plate 16 through a living hinge 19. Preferably, the entire coupling component is molded as an integral unit, although the use of the living hinge is a convenience rather than a limiting factor for the present invention.

Figure 2:
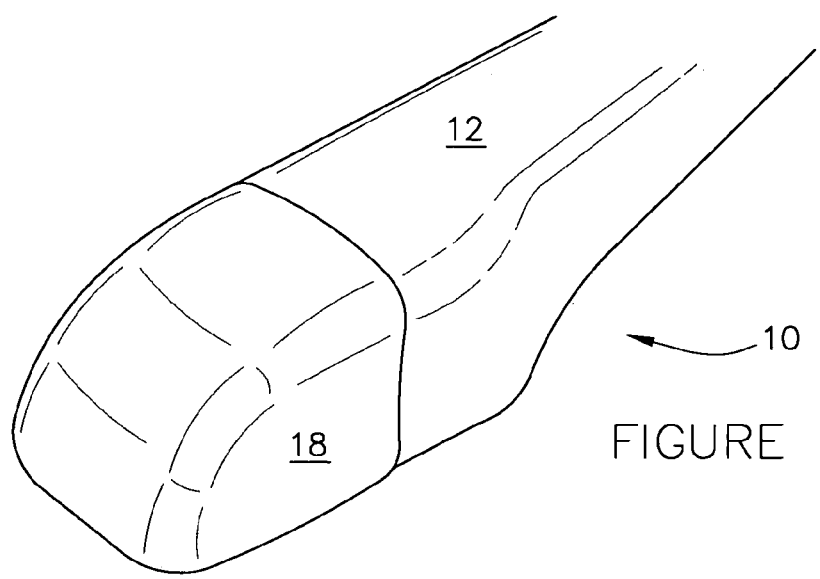
FIG. 2 is a schematic representation of a perspective view similar to the embodiment of FIG. 1 showing the cap covering the coupling arrangement.

Coupling component 15 further includes coupling structure for holding cap 18 in place (as shown in FIG. 2) and for permitting the coupling of accessories thereto. With regard to accessories, the illustrated arrangement includes a first coupling device shown as a pair of projections or elongated members (shown as rails 21 and 22), the rails being spaced apart on either side of aperture 20 and substantially parallel to one another. Each rail is shown to include an undercut portion 23 extending along the lower outside portion of the rails. It will be appreciated by reference to FIG. 1, the cap 18 includes a second coupling device (shown as tabs 25) at a location so that when folded about hinge 19, tabs 25 will pass over rails 21 and 22, allowing tabs 25 to "snap" into the undercut portions 23 and hold cap 18 in place. In the illustrated embodiment, space 29 is provided between an end of the coupling device 15 and handle 12, thereby further assisting the proper location of the tabs when the cap is attached to the coupling structure to trim out the assist handle.

Assist handle assembly 10 is attached to a suitable vehicle location by placing it at the desired location with the cap 18 in the open position as shown in FIG. 1. When it is desired to trim out the end of handle assembly 10, cap 18 is rotated to the position shown in FIG. 2.

Coupling device 15 further includes structure configured to receive various accessories (illustrated and described below in connection with FIGS. 3-11B), and in this case, the connection technique uses mating rails located within the accessories and adapted to extend beneath the undercut portions 23 to "lock" the accessory in place when tabs 28 at the outer ends of rails 21 and 22 snap into a suitable receiving opening in the accessory. Prior to coupling, it is preferred to sever the living hinge 19 and retain cap 18 for subsequent use in the event that it is desired to remove the accessory without substituting another accessory therefore. As indicated above, a wide variety of coupling techniques could be substituted for the structure shown in FIG. 1.

Figure 3:
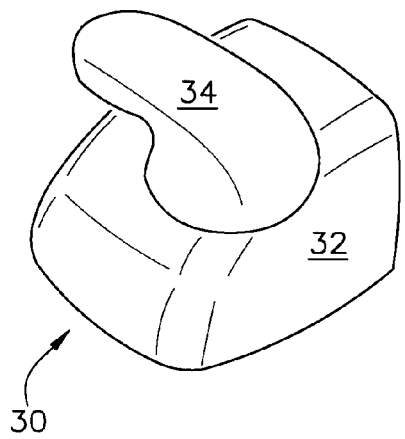
FIG. 3 is a schematic representation of a perspective view of a hook accessory adapted to be attached to the assist handle assembly of the embodiment of FIG. 1.

Proceeding next to FIG. 3, a storage accessory (shown as a hook accessory 30) includes a body 32 shaped generally like cap 18 but including the aforementioned rail structure within. A hook 34 is coupled to body 32, either as an integral piece or as an addition thereto. Sliding hook accessory 30 into position after removal of cap 18 provides a first example of the use of an accessory with the assist handle assembly of FIG. 1 according to the present invention.

Figure 4:
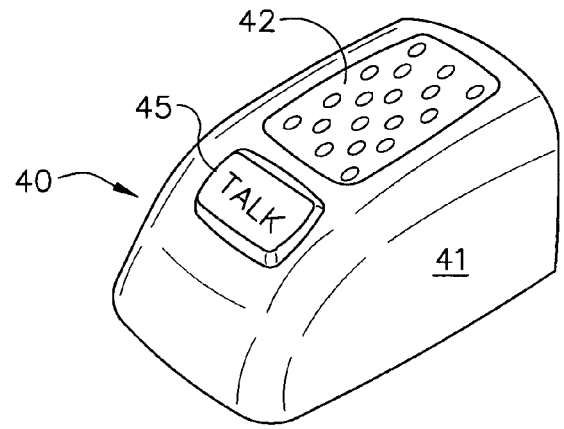
FIG. 4 is a schematic representation of a perspective view of a communication accessory adapted to be attached to the assist handle assembly of the embodiment of FIG. 1.

Another example of an accessory is shown in FIG. 4 where a communication accessory 40 is provided. The details of the communication system need not be provided here because, in and of itself, it is not intended to form part of the present invention. It is sufficient to point out that the communication device includes a body 41, a "talk button" 45, and a microphone 42. A passenger within the vehicle could activate the microphone 42 by pressing the talk button as part of a communication system which is becoming increasingly popular with multi-row seating.

Figure 5:
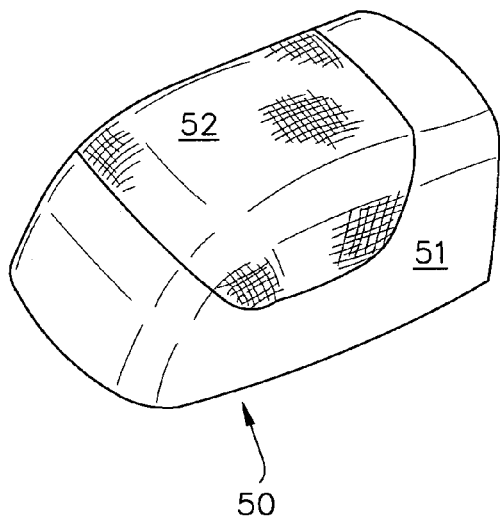
FIG. 5 is a schematic representation of a perspective view of a speaker accessory adapted to be attached to the assist handle assembly of the embodiment of FIG. 1.

A still further example of an accessory is shown in FIG. 5 where a speaker accessory 50 is shown. This accessory includes a body 51 and a speaker 52 mounted therein. As indicated above, the speaker may be coupled to a vehicle communication or entertainment device using known techniques.

Figure 6:
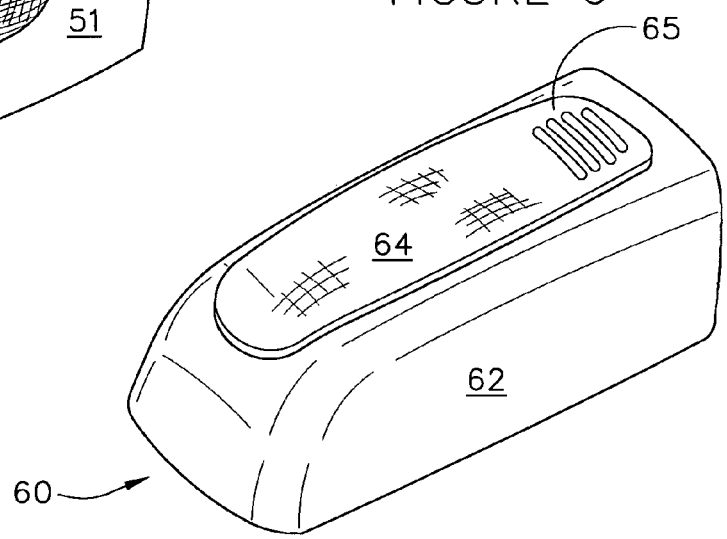
FIG. 6 is a schematic representation of a perspective view of a push-push or stationary light accessory adapted to be attached to the assist handle assembly of the embodiment of FIG. 1.

Another accessory is illustrated in FIG. 6, shown as a "push-push" light accessory 60 that includes a body 62, an illumination source and lens assembly 64, and a push pad 65. Located within body 62 is a light source together with suitable power supply (e.g., a battery or light cell or wiring to the vehicle's electrical system). As is apparent from the dimensions of FIG. 6, it can be seen that the overall accessory length can exceed that of the original cap 18 without departing from the invention's intended scope.

Figure 7:
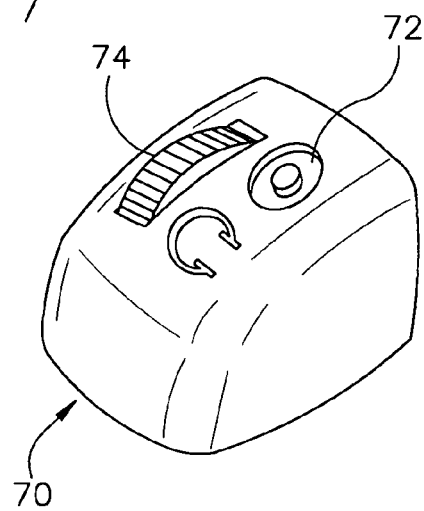
FIG. 7 is a schematic representation of an audio accessory adapted for use with the assist handle assembly according to the embodiment of FIG. 1.

Referring to FIG. 7, an audio accessory 70 is shown according to the illustrated embodiment. Audio accessory 70 is shown to include a headphone jack 72 with a volume control knob 74 that may be configured to receive and convey an audio signal (such as from a radio, CD player, MP3 player or the like). According to an alternative embodiment, the audio accessory may include multiple headphone jacks and volume control knobs or other control features (e.g. balance, treble, bass, etc.).

Figure 8:
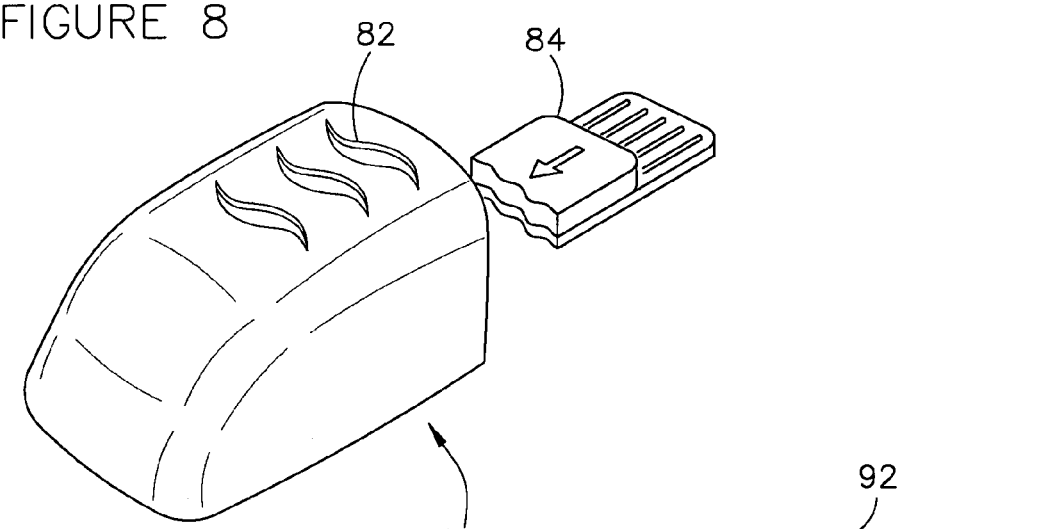
FIG. 8 is a schematic representation of an aromatic accessory adapted for use with the assist handle assembly according to the embodiment of FIG. 1.

Referring to FIG. 8, an aromatic (e.g. olfactory, etc.) accessory shown as an air freshener accessory 80 is provided according to the illustrated embodiment. Air freshener accessory 80 is shown to include vents 82 and a scented refill pack 84 that may be replaced on an as needed basis. The scented refill pack may be configured to receive electrical power or may be configured for use without a power source.

Figure 9:
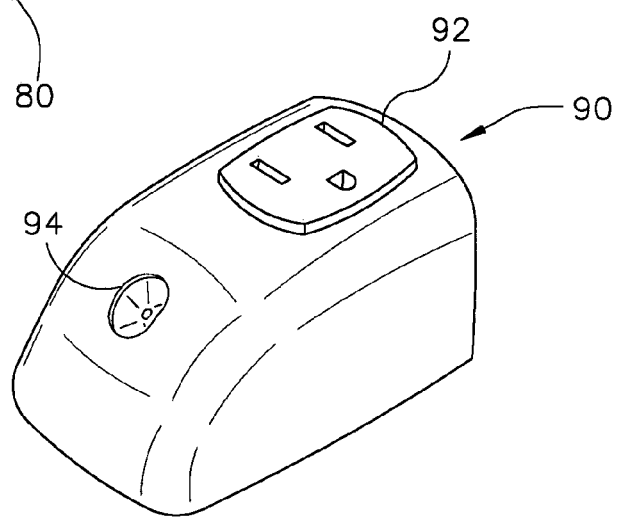
FIG. 9 is a schematic representation of a receptacle accessory adapted for use with the assist handle assembly according to the embodiment of FIG. 1.

Referring to FIG. 9, a power/signal outlet accessory 90 is shown according to the illustrated embodiment. Power/signal outlet accessory 90 is shown to include various power and signal outlets (shown for example as an electrical power outlet 92 and a coaxial cable connector 94). It should be noted that any of a wide variety of signal outlets may be provided and that the power outlet may be configured to provide the desired voltage level in either AC or DC.

Figure 10A:
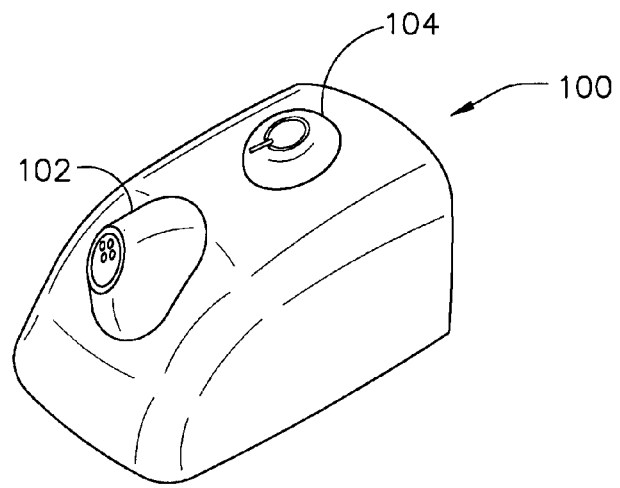
FIGS. 10A and 10B are schematic representations of a projection accessory adapted for use with the assist handle assembly according to the embodiment of FIG. 1.
Figure 10B:
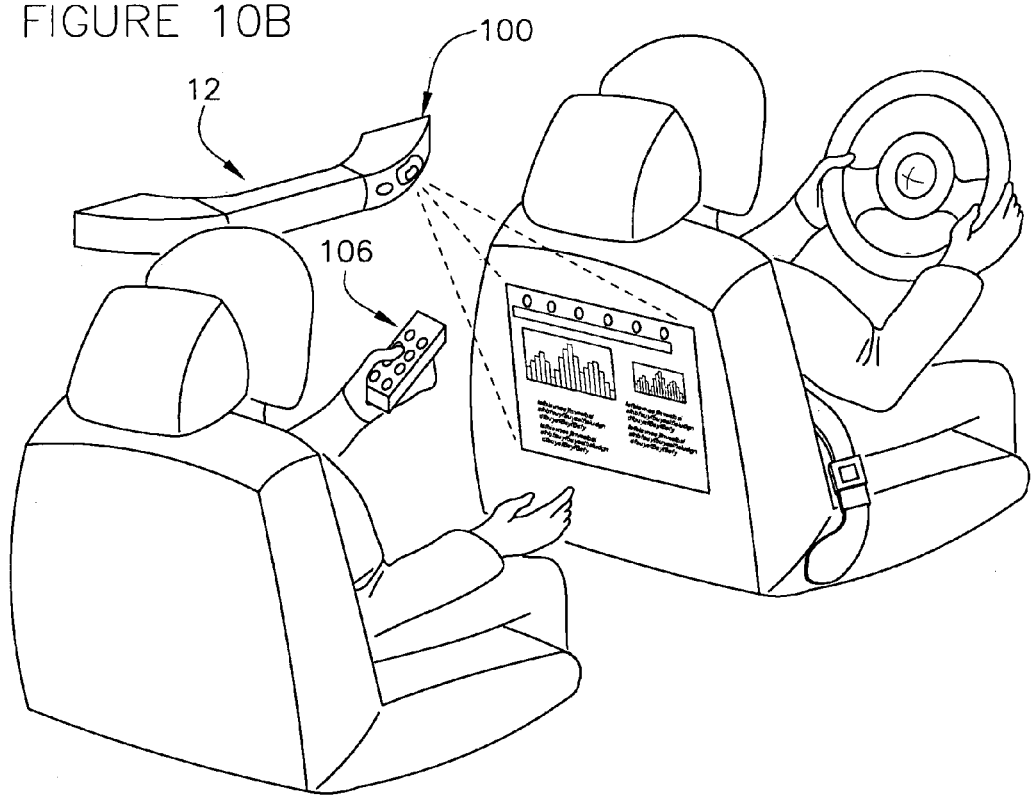

Referring to FIGS. 10A and 10B, a video/data projector accessory 100 is shown according to the illustrated embodiment. Projector accessory 100 is shown to include a projection head 102 (e.g. lens, source, etc.) for projecting an image of data generated from a device within the vehicle (such as, for example, a computer, a DVD player, etc.). Projector accessory 100 is also shown to include a user control interface 104 (e.g. button, remote control signal interface, etc.) configured to control operation of the projector accessory either by direct manual operation, or by remote control operation (such as by remote control device 106). The projection head may be configured to project the image on any suitable surface (shown for example as a rear surface of a front seat back).

Figure 11A:
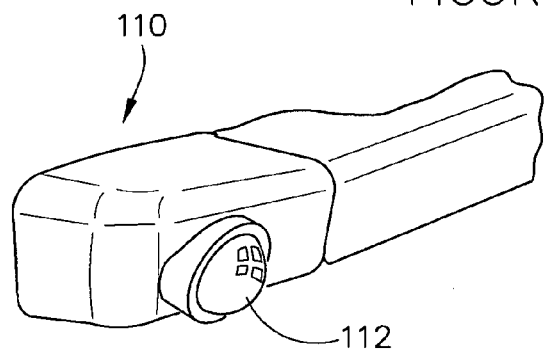
FIGS. 11A and 11B are schematic representations of a camera accessory adapted for use with the assist handle assembly according to the embodiment of FIGS. 1 and 2.
Figure 11B:
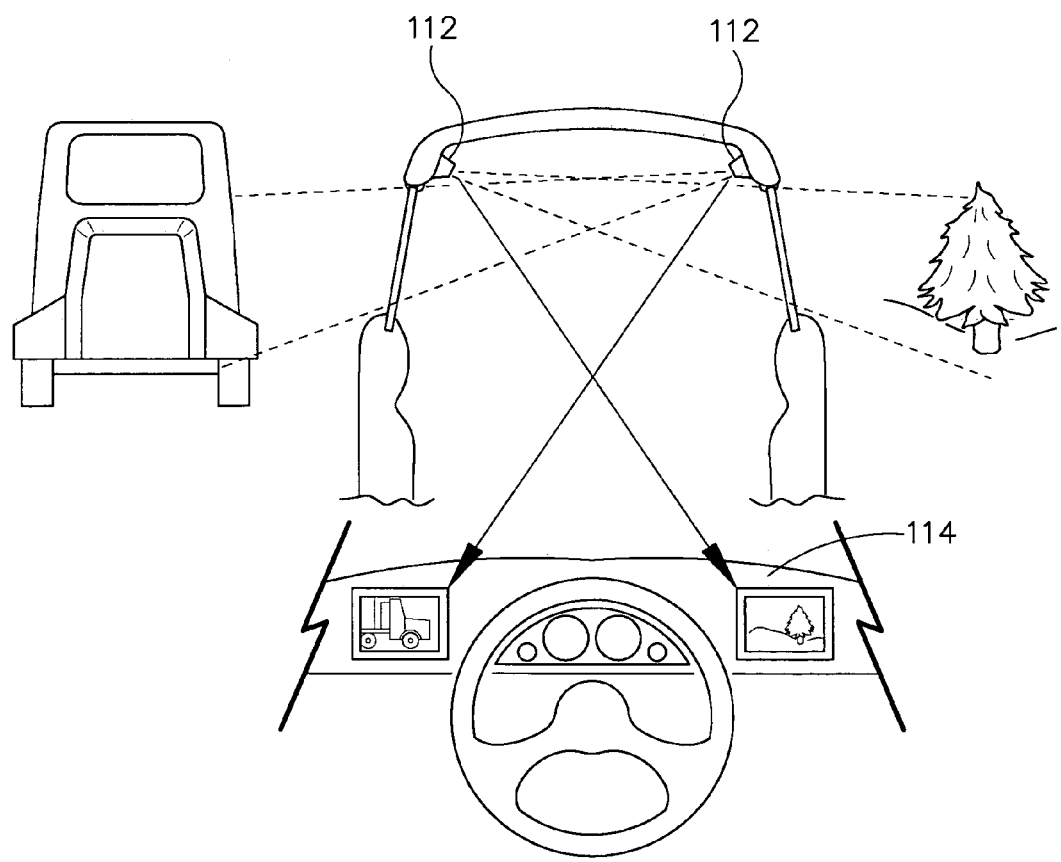

Referring to FIGS. 11A and 11B, a camera accessory 110 is shown according to an illustrated embodiment. Camera accessory 110 may be configured for use as a video camera, a still image camera, a web camera, or the like. Camera accessory 110 includes lens 112 for recording an image. For example, a first camera accessory 110 on a first side of a vehicle may be configured to provide an image of objects in a "blind spot" relative to a position of the vehicle. Also, a second camera accessory on an opposite side of the vehicle may be configured to provide an image of objects behind a vehicle. The camera accessory 110 may also include a projection head (such as shown in FIGS. 10A and 10B) for projecting an image recorded by the camera accessory for viewing by a driver of the vehicle (shown schematically as projected onto a surface on or adjacent to an instrument panel 114). The camera accessory may also be configured to record an image of occupants of a rear seat or third row seat (e.g. children, etc.) and may be configured for wireless transmission of the image to a receiving device (e.g. computer, monitor, etc.) at a remote location (not shown).

It bears repeating at this point that only a single end of the assist handle 12 is shown, but a similar or identical coupling system could be provided at the other end and include an identical accessory or a totally different accessory depending on the desires of the owner.

A wide variety of combinations and customization options have been described in the above sections of the specification. It should be apparent that the shape of the cap could be varied to enhance the overall aesthetic appearance of the vehicle interior. It could be larger or smaller than that shown and, as previously indicated, the living hinge is a preferred, but not limiting, technique for providing trim out of the coupling device when it is initially installed and before customization.

It is also important to note that the construction and arrangement of the elements of the assist handle provided herein is illustrative only. Although only a few exemplary embodiments of the present invention have been described in detail in this disclosure, those skilled in the art who review this disclosure will readily appreciate that many modifications are possible in these embodiments (such as variations in handle contour, shape and size, variations in configuration of electrical connections, contacts and routing of conductors, variations in the type, nature, size, shape and function of accessories, variations in the structure and orientation of the connecting members, and installation location, sizes, structures, shapes and proportions of the various elements, mounting arrangements, rotational and pivoting arrangements, use of colors, combinations of shapes, etc.) without materially departing from the novel teachings and advantages of the invention. Accordingly, all such modifications are intended to be within the scope of the invention as defined in the appended claims.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. An assist handle assembly for receiving accessories for use in a vehicle, comprising:
    a handle component having a first end and a second end;
    a coupling component proximate at least one of the first end and the second end;
    a coupling structure disposed on the coupling component to interchangeably receive a plurality of accessories selected from the group consisting of a speaker, a microphone, an audio interface, a camera, an image projector, and a power outlet;
    so that any one of the plurality of accessories can be removably attached to the coupling structure by a user.

2. The assembly of claim 1 wherein the accessory is slidably attached to the coupling component by the coupling structure.

3. The assembly of claim 1 wherein the coupling structure comprises at least one rail member.

4. The assembly of claim 3 wherein the at least one rail member comprises a pair of substantially parallel rails.

5. The assembly of claim 4 wherein the rails have an undercut portion.

6. The assembly of claim 5 wherein the accessory includes tabs configured to slideably engage the undercut portion.

7. The assembly of claim 1 further comprising a removable cap coupled to the coupling component by a living hinge.

8. The assembly of claim 7 wherein the cap is configured to be separated from the coupling component.

9. The assembly of claim 8 wherein the cap is reattachable to the coupling component in the event that the accessory is removed.

10. The assembly of claim 1 wherein one of the accessories is interchangeably attached at the first end and another of the accessories is interchangeably attached at the second end.

11. The assembly of claim 1 wherein the accessory is an aesthetic accessory.

12. The assembly of claim 1 wherein the accessory is a powered accessory.

13. The assembly of claim 1 wherein at least one of the accessories is a functional accessory.

14. An assist handle assembly for receiving accessories for use in a vehicle, comprising:
    a handle component having opposite ends;
    a coupling component proximate at least one of said ends;
    a receiving member disposed on the coupling component to operably and interchangeably engage any one of a plurality of different types of accessories;
    wherein the accessories include at least one of a microphone, a speaker, a headphone jack, an audio volume control device, a video projector, a data projector, and an image recording device;
    so that a user can customize a functionality of the assist handle assembly by selecting a desired accessory from the different types of accessories.

15. The assembly of claim 14 wherein the receiving member comprises a rail.

16. The assembly of claim 14 wherein the accessory comprises at least one tab configured to engage the receiving member to couple the accessory to the handle component.

17. The assembly of claim 14 wherein the receiving member comprises at least one elongated L-shaped member adapted to slideably and interchangeably receive a mating member on the accessory.

18. The assembly of claim 17 wherein the coupling component includes an electrical connector adapted to interchangeably interface with one or more of the accessories.

19. The assembly of claim 14 wherein the accessory is operable to communicate a signal to an occupant of the vehicle.

20. The assembly of claim 14 wherein the accessory is operable to project a video image on a surface of the vehicle.

21. The assembly of claim 20 wherein the accessory is configured to wirelessly transmit the video image to a receiving device.

22. The assembly of claim 14 wherein the accessory comprises a camera.

* * * * *